March 25, 1952     C. V. OSBORNE     2,590,567

CAR WHEEL

Filed April 21, 1950

Inventor

Charles V. Osborne

By John N. Randolph

Attorney

Patented Mar. 25, 1952

2,590,567

UNITED STATES PATENT OFFICE 2,590,567

CAR WHEEL

Charles V. Osborne, Wise, Va.

Application April 21, 1950, Serial No. 157,300

1 Claim. (Cl. 295—50)

This invention relates to a novel construction of car wheel of the type adapted to engage a rail and is primarily intended for use as a mine car wheel.

A primary object of the present invention is to provide a car wheel of extremely simple construction which may be readily fabricated from short lengths of pipe of proper diameters and relatively heavy gauge and from a plurality of disks of different sizes and of suitable gauge.

Still a further object of the invention is to provide a wheel defining an oil chamber which is capable of being partially filled and sealed with a lubricating oil for lubricating anti-friction bearings of the wheel, as the wheel is revolved.

Various other objects and advantages of the invention will hereinafter become more fully apparent from the following description of the drawing, illustrating a preferred embodiment thereof, and wherein.

Figure 1:
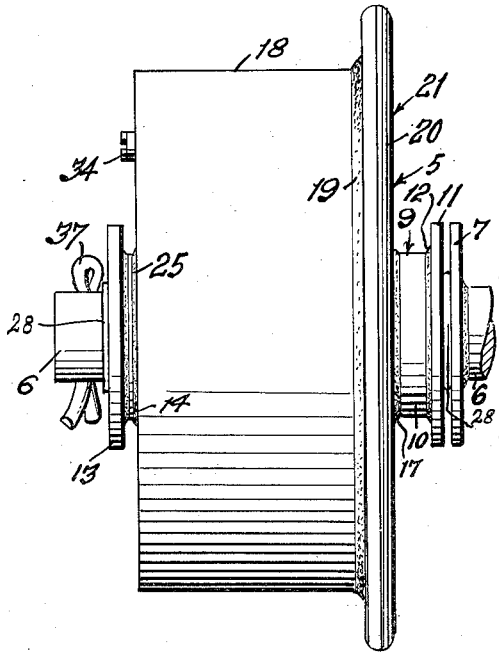
Figure 1 is an edge elevational view of the assembled wheel.

Referring more specifically to the drawing, the wheel, designated generally 5, is shown mounted on an end of a wheel axle 6. An annular disk 7 is secured by welding at 8 to the axle 6 to provide an abutment for the inner end of the hub of the wheel 5, as will hereinafter become apparent.

The wheel 5 includes a hub, designated generally 9 which is formed from a short length of pipe 10 of suitable diameter to fit loosely around the axle 6 and which has an annular member 11 secured to its inner end as by welding at 12 so that the inner portion of the annular member 11 extends inwardly from the bore of the pipe 10 and its outer portion projects outwardly from the periphery of the pipe 10. The bore of the annular member 11 is adapted to engage loosely around the axle 6 and said member 11, constituting the inner end of the hub 9, is adapted to be disposed adjacent the annular member 7 which forms a stop for limiting movement of the wheel 5 inwardly of the axle end. The hub 9 also includes an outer annular member 13, similar to the annular member 11 and which is secured to the opposite end of the pipe 10 by welding as seen at 14 and which likewise extends inwardly of the bore of the pipe 10 and outwardly of its periphery. The member 13 has a bore of the same diameter as that of the member 11. However, said member 13 is not secured to the outer end of the pipe 10 until after the remainder of the wheel, hereinafter to be described, has been assembled on the hub 9.

The wheel 5 also includes an inner wall 15 formed from a disk having a central opening 16 which fits snugly around the pipe 10 and is secured thereto by welding, as seen at 17, adjacent the hub member 11. A short length of pipe 18 of a substantially larger diameter than the pipe 10 forms the felly or rim of the wheel 5 and has one end thereof abutting against the wheel side 15, on the side thereof remote to the hub end 11, and which is secured thereto by welding as seen at 19 on the inner and outer sides of the rim 18. The rim 18 is disposed concentrically around the hub portion 10 and is substantially shorter than the hub portion so that the opposite, outer edge of the rim 18 is spaced inwardly from the hub end 13. The side wall 15 of the wheel 5 extends outwardly substantially beyond the periphery of the rim 18 and the peripheral portion thereof is turned inwardly, away from the rim 18 to provide an annular reinforcing strip 20 which, together with a portion of the wheel side 15 which extends outwardly from the rim 18 forms the wheel flange, designated generally 21. The inner edge of the reinforcing strip 20 is welded at 22 to the wheel side 15. If desired, the annular reinforcing strip 20 may constitute a separate strip secured by welding at 22 to the outer portion of the wheel side 15.

Figure 2:
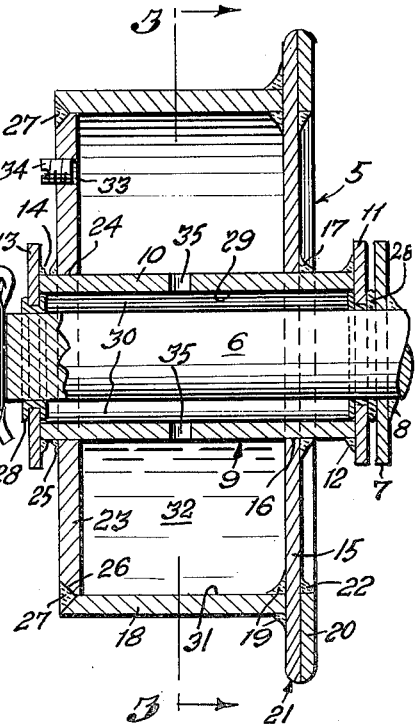
Figure 2 is a central vertical sectional view of the wheel taken in the plane of the wheel axis.
Figure 3:
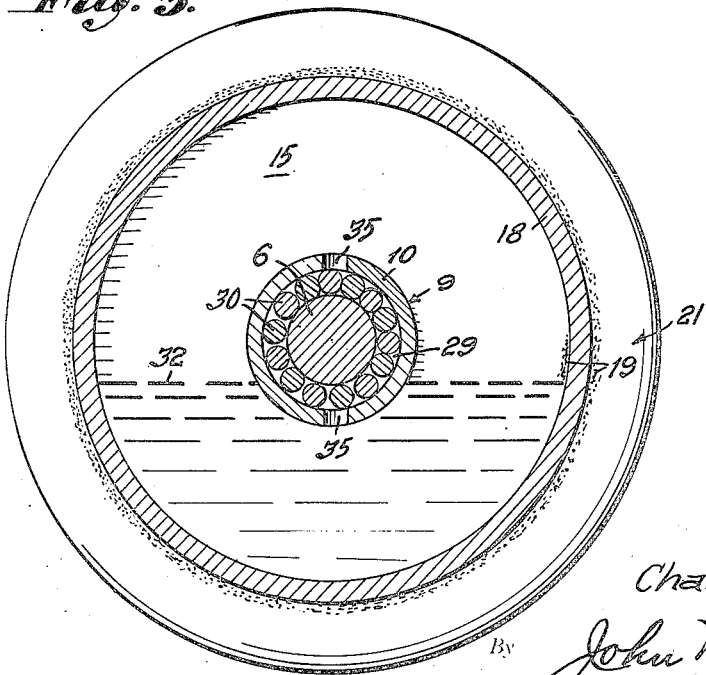
Figure 3 is a sectional view of the wheel taken substantially along a plane as indicated by the line 3—3 of Figure 2.

An annular disk 23 forms the other, outer side wall of the wheel 5 and has an opening 24 which engages snugly around the pipe 10 and is secured thereto by welding, as seen at 25. The side 23 is applied and secured to the hub 9 after the wheel side 15 and rim 18 have been assembled. The outer wheel side 23 is of an outer diameter to fit snugly in the outer end of the rim 18, as seen in Figure 2 and the outer end of the rim 18 is beveled on its inner side and the outer portion of the side 23 is beveled on its outer side so that said beveled portions combine to form an annular groove 26 of V-shaped cross section to receive welds 27 by which the rim 18 is secured to the wheel side 23. After the wheel side 23 has been secured to the hub 9 the hub end 13, previously described, is applied. An annular oil seal 28 of outwardly opening channel-shaped cross section is disposed between each of the hub members 11 and 13 and the axle 6 to seal the annular chamber 29 formed by the pipe 10 and axle 6 and the hub end members 11 and 13. Said chamber 29 contains a plurality of roller or needle bearings 30 providing an anti-friction mounting between the axle 6 and the wheel hub 9. The pipe 10, wheel sides 15 and 23 and the rim 18 combine to form an annular chamber 31 within the wheel 5 which is adapted to be filled with lubricating oil, as indicated at 32, up to approximately the level as seen in Figure 3. The outer side wall 23 is provided with a threaded port 33 by which oil can be applied to the chamber 31 when the port 33 is disposed above the axle 6 and a threaded plug 34 is provided for sealing the port 33. The pipe 10 is provided with one or more ports 35, intermediate of its ends forming a communicating passage or passages between the chambers 29 and 31 through which the oil 32 may enter the chamber 29 for lubricating the needle bearings 30 and the axle 6.

The axle end 6 adjacent its terminal is provided with a diametrically extending bore 36 to receive a cotter pin 37 to retain the wheel 5 between said cotter pin and the flange 7.

From the foregoing it will be readily apparent that a car wheel of extremely simple construction has been provided which may be readily fabricated from short lengths of pipe of suitable diameters and gauges and from a plurality of disk members, which parts may be readily secured together as by welding to provide a complete wheel having a sealed oil chamber the supply of oil to which may be readily replenished for providing a constant lubrication for the wheel journal. The rim 18 may be formed of a length of pipe of various diameters as for example 8 inch, 10 inch or 12 inch and the hub portion or pipe 10 may be formed of a length of pipe of 2 inch or 3 inch diameters. The pipes and annular members may be made of various thicknesses sufficient to sustain the weight of the load which the wheel is intended to support.

Various modifications and changes are contemplated and may obviously be restored to, without departing from the spirit or scope of the invention as hereinafter defined by the appended claim.

I claim as my invention:

A track engaging car wheel comprising a hub composed of a length of pipe and an annular member fixed to each end of the pipe, each of said annular members providing an inwardly extending annular flange, said inwardly extending annular flanges defining aligned openings adapted to be loosely disposed around a wheel axle; an annular disk having a bore fitting snugly around the pipe of the hub and secured thereto adjacent one end of the hub, a length of pipe of larger diameter than said hub disposed concentrically around the hub and having one end thereof abutting against one side of the annular member forming the inner side of the wheel and secured thereto, said inner side of the wheel having an annular portion extending outwardly from the last mentioned pipe and forming an annular wheel flange, said last mentioned pipe forming the wheel rim or felly, an annular member forming the outer side of the wheel having a central opening snugly fitting around the pipe of the hub and secured thereto adjacent its opposite end, said outer wheel side having an external diameter corresponding to the internal diameter of the wheel rim and fitting snugly therein adjacent the opposite end of the wheel rim and secured thereto, and a plurality of needle bearings disposed between the pipe of the hub and the wheel axle and between the inwardly extending flanges of the end portions of the hub and providing an anti-friction support for said wheel relatively to the axle, said hub pipe, wheel rim and the inner and outer sides of the wheel combining to form an annular lubricating chamber, one of said side walls having a threaded filling opening for supplying a lubricant to said chamber, a threaded plug for closing and sealing said filling opening, and said hub pipe having at least one radial opening communicating with its bore and with said lubricating chamber for supplying a lubricant from the chamber to the needle bearings, and annular oil seals of channel-shaped cross section engaging between the inwardly extending annular flanges of the hub ends and the axle and sealing the ends of the hub space occupied by the needle bearings.

CHARLES V. OSBORNE.

REFERENCES CITED

The following references are of record in the file of this patent:

UNITED STATES PATENTS

| Number | Name | Date |
|---|---|---|
| 1,104,549 | Sanford | July 21, 1914 |
| 1,338,939 | Laycock | May 4, 1920 |
| 1,466,434 | Gillette | Aug. 28, 1933 |
| 1,945,506 | Angle | Feb. 6, 1934 |
| 2,187,777 | Gannett | Jan. 23, 1940 |
| 2,295,531 | Heaslet | Sept. 15, 1942 |
| 2,331,780 | Hoke | Oct. 12, 1943 |